Jan. 5, 1932.　　　J. V. PETRELLI　　　1,839,992
CHANGE SPEED OR REVERSE GEARING
Filed Dec. 5, 1929
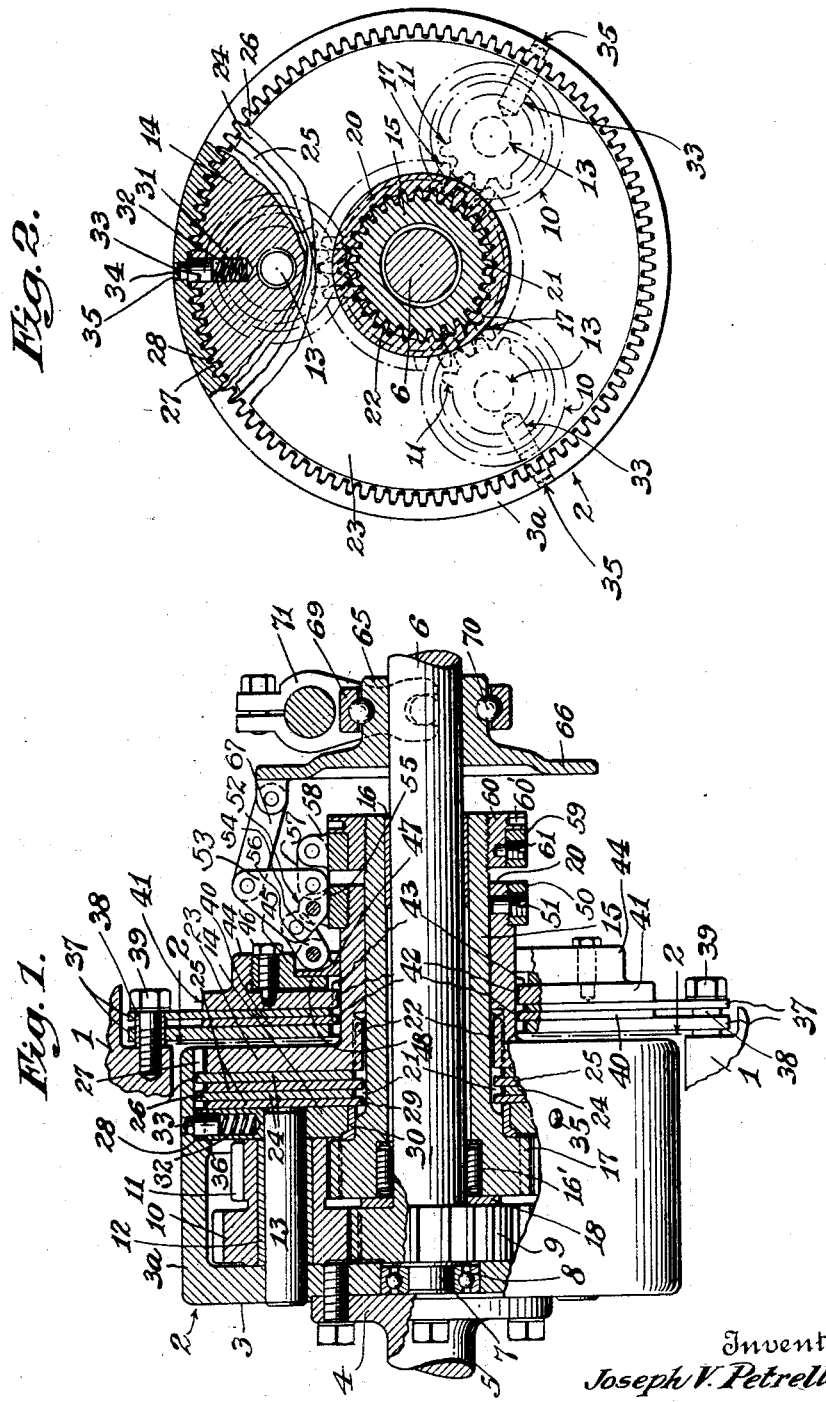
Inventor:
Joseph V. Petrelli,
By his Attorney Patented Jan. 5, 1932

1,839,992

UNITED STATES PATENT OFFICE

JOSEPH V. PETRELLI, OF NEW ROCHELLE, NEW YORK

CHANGE SPEED OR REVERSE GEARING

Application filed December 5, 1929. Serial No. 411,730.

My invention relates to change speed or reverse gearing of the planetary type. When designed as reverse gearing, it is especially well adapted for marine service, although it is not limited as to its utility.

The principal objects are to provide a new and improved construction or arrangement of multi-plate clutches for controlling direct and reverse or reduced-speed driving, and especially, improved means or arrangements for assembling and securing in place parts of such clutch mechanism; and also to provide new and improved double toggle mechanism for operating such clutches. A further object is to generally improve the structure of such gearing from the standpoints of durability and reliability.

The characteristics and advantages of the invention are further sufficiently explained in connection with the following detail description of the accompanying drawings, which shows one representative embodiment. After considering this example, skilled persons will understand that many variations may be made without departing from the principles disclosed, and I contemplate the employment of any structures that are properly within the scope of the appended claims.

Fig. 1 is a longitudinal section of gearing embodying the invention in one form.

Fig. 2 is a section in the general plane 2—2, Fig. 1, with some parts broken away in different planes.

In Fig. 1, 1 is a part of an annular member of an engine crank case or other stationary structure with which the gearing is associated. The gearing proper includes a drum or housing 2, the plate or web portions 3 of which is bolted to a flange 4 at the end of the engine crank shaft 5, or to any other suitable driving member. The driven shaft 6 connected to the boat propeller or other device to be driven, has at its forward end (with reference to the position in a boat, for example) a reduced portion 7 seated in the inner ring of a ball bearing 8, the outer ring of which is seated in a bore at the center of the drum web 3. Close to the web, shaft 6 has a gear 9. Each of the three or more groups of planet pinions includes, in the specific embodiment shown, a large pinion 10 and operatively-integral therewith a smaller pinion 11, these being revolubly mounted on a bushing 12 carried by a shaft 13. The forward ends of the shafts are secured in the drum web 3, and the rear ends are seated in holes in a clutch abutment plate 14.

A sleeve or sleeve-shaft 15 is revolubly mounted on shaft 6, this mounting at the rear end consisting of a bushing 16 and at the front end of a roller bearing 16'. At its forward end the sleeve shaft has a gear 17, larger than gear 9, and a flat thrust ring or washer 18 is placed between gears 17 and 9.

Another sleeve 20 is slidably mounted on sleeve 15 and prevented from relative rotation by teeth 21, similar to gear teeth, cut on sleeve 15 and engaging internal teeth 22 of sectional form complemental to teeth 21 and cut in the forward part of the bore of sleeve 20. Sleeve 20 carries at its forward end a plate 23, which may for convenience be identified as an intermediate pressure plate, and acts also as a friction plate, as will appear. This intermediate plate 23 forms an operative part of both the direct drive and indirect drive clutches. The direct drive clutch includes in addition to plates 14 and 23, driving plates or disks 24, and driven disks 25, these disks being of any suitable number as indicated by the power to be transmitted and other factors of design, and being located between plates 14 and 23. The driving disks 24 have on their peripheries gear teeth 26 engaging in modified internal gear teeth 27 formed in the inner face of the cylindrical portion 3a of drum 3 at the rear end thereof. Abutment plate 14 has also on its periphery, gear teeth 28 engaging the internal teeth 27 of the drum. This tooth connection provides for the necessary limited longitudinal movement of the plates, and also by reason of the tooth formation, and especially the form of the internal teeth, which is complemental to the sectional contour of the spur teeth on the plates and disks, provides ample area of contact, preventing wear, cutting, etc., and allowing free axial movement of the disks. Similarly, the driven disks 25 have internal teeth 29 engaged with the spur teeth 21 of sleeve 20.

Plate 14 has in its central aperture a bushing 30, providing a bearing on a cylindrical portion of sleeve 15 close to gear 17. An important feature of the invention is the provision of means for easy assembly and disassembly of the pressure plate 14 in drum 3, and secure retention of the plate in place, and also provision for the thrust strains on the plate. For this purpose, the plate has in its outer portion a plurality of circularly spaced sockets, or radial bores 31. A spring 32 is located in each socket, and a plunger 33 is also located in the socket bearing on the spring. The plungers have reduced or stud end portions 34 to cooperate with sockets or holes 35 in the drum portion 3a, and spaced in correspondence with the circular spacing of the plate sockets and plungers. In placing the plate in position, the plungers are pressed inward to allow the plate and plungers to be passed into the rear end of the cylindrical drum portion 3a, which has an internal annular shoulder 36 against which the outer margin of the plate rests when in final position, as shown in Fig. 1; and in that position, the plunger studs 34 snap into the sockets of the drum and prevent unintentional rearward displacement of the plate in an obvious way, while thrust strains tending to move the plate forward in relation to the drum are taken up by flange 36 and cannot be communicated to the gears, shafts or other parts. The abutment plate may be removed, after other parts are removed, by merely pressing the plungers inward, as by applying a rod through the holes 35, whereupon the plate may be slid back out of the drum.

The clutch for indirect drive comprises, in addition to the intermediate plate 23, stationary plates or disks 37, which have near their outer edges circularly spaced holes, the corresponding holes of each of the plates receiving a bushing 38. A screw 39 passes through each of the bushings, and engages a threaded hole in the stationary member 1 above referred to, thus locking the bushings firmly in position and providing for the irrevoluble support and necessary slight axial movement of plates 37. The indirect drive clutch also includes one or more revoluble disks 40 and a pressure plate 41. The disk or disks and plate have internal teeth 42 similar to the internal teeth already described and engaging spur teeth 43 formed on sleeve 20 adjacent plate 23, thus providing for irrevoluble connection of the friction disks and pressure plates to the sleeves, and necessary relative axial movement. The pressure plate 41 has a cylindrical extension 44 internally threaded, and an adjustment ring 45 is screwed into this extension and secured in adjusted position by screws 46, the ends of which engage in sockets in the pressure plate.

A thrust spring or collar 47 is slidably mounted on sleeve 20 and revolubly engages a flange 48 of the adjustment ring 45.

The clutches are selectively operated by double toggle mechanism. This includes a ring 50 screwed or otherwise placed on the rear end of sleeve 20, and additionally secured as by set screws 51. This ring has circularly-spaced lugs 52 in which generally triangular toggle levers 53 are pivotally mounted. The inner ends of these levers are formed with angularly disposed faces 54 and 55, acting as stops for the two extreme positions of the plates by cooperation with the outer face of the supporting ring. Toggle links 56 connect forward, inward portions of the toggle levers pivotally with lugs on the rear face of the thrust collar 47, and similar toggle links 57 pivotally connect the rear inward portions of the toggle levers with lugs 58 on the periphery of a ring 59, which is seated on an adjustment ring 60 and secured thereto, as by set screws 61. The adjustment ring 60 has threaded engagement with the rear end sleeve 15 and is provided with a nut formation or with sockets 60' to receive a spanner. The toggles are operated by a collar 65, slidably mounted on shaft 6, and having a plate or flange 66 connected by links 67 to the outer ends of the toggle levers 53. The collar or shifter 65 is moved by a ring 69, with a ball thrust bearing 70, and shifting yoke 71 as usual.

The adjustable rings 45 and 60 provide for adjustment of the toggles, and thus for proper clutch action, and also permit wear to be compensated for by readjustment. The adjustment of ring 45 is obvious from previous description. The ring 60 is adjusted by first withdrawing the set screw or screws 61, then turning ring 60, and reinserting the set screws to maintain the adjustment.

In operation, with the parts as shown in Fig. 1, the gearing is in direct drive position. Shifter 65 has been moved rearward (or to the right as viewed in Fig. 1) thus straightening the toggle links 57 and moving sleeve 20 and its plate 23 forward in relation to sleeve 15 and abutment plate 14, thus locking the direct drive clutch, and preventing relative rotation of sleeves 15 and 20 and also preventing rotation of gear 17 in relation to shaft 6 and gear 9; or in other words, locking the gearing and effecting direct drive. For indirect drive, which as shown is a reverse drive, on account of the relative diameters of the gears and planetary pinions, the shifter is moved forward, thus moving the toggle links 57 to angular position and straightening links 56. This moves sleeve 20 and plate 23 rearward (or to the right in Fig. 1) in relation to pressure plate 41, freeing the direct drive clutch and engaging the indirect drive clutch, or in effect locking sleeves 20 and 15 to the housing member 1. Gear 17 is thus held stationary, and acts as an abutment for the planetary pinions, which by reason of their relative dimensions as shown, cause gear 9 and shaft 6 to be rotated in the reverse direction. It will be evident that by proper reproportioning of the gears and planet pinions, low speed forward driving may be provided, if desired, instead of a reverse drive.

It is also evident that the described toggle mechanism provides for powerful clutch action with greatly reduced wear, as compared with dog and cone clutches or other devices frequently employed.

I claim:

1. Planetary gearing comprising a drum, gearing therein, a driven shaft, a first sleeve revoluble on the shaft and carrying one of the gears, a second sleeve slidably and irrevolubly mounted on the first sleeve, an abutment plate in the drum, one or more driving disks irrevolubly located in the drum, one or more driven disks interspaced with the driving disks and irrevolubly connected to the first sleeve, one or more irrevoluble friction plates, one or more revoluble friction plates interspaced with the stationary plates and irrevolubly connected to the second sleeve, and a plate on the second sleeve intermediate the sets of disks and cooperating with either of them to effect direct or indirect drive.

2. Planetary gearing comprising a drum, gearing therein, a driven shaft, a first sleeve revoluble on the shaft and carrying one of the gears, a second sleeve slidably and irrevolubly mounted on the first sleeve, an abutment plate in the drum, one or more driving disks irrevolubly located in the drum, one or more driven disks interspaced with the driving disks and irrevolubly connected to the first sleeve, one or more irrevoluble friction plates, one or more revoluble friction plates interspaced with the stationary plates and irrevolubly connected to the second sleeve, and a plate on the second sleeve intermediate the sets of disks and cooperating with either of them to effect direct or indirect drive, one of the plates irrevolubly connected to said second sleeve serving as a pressure plate.

3. Planetary gearing comprising a drum, gearing therein, a driven shaft, a first sleeve revoluble on the shaft and carrying one of the gears, a second sleeve slidably and irrevolubly mounted on the first sleeve, an abutment plate in the drum, one or more driving disks irrevolubly located in the drum, one or more driven disks interspaced with the driving disks and irrevolubly connected to the first sleeve, one or more irrevoluble friction plates, one or more revoluble friction plates interspaced with the stationary plates and irrevolubly connected to the second sleeve, and a plate on the second sleeve intermediate the sets of disks and cooperating with either of them to effect direct or indirect drive, and double toggle mechanism and a shifter therefor to frictionally engage either set of disks for direct or indirect driving.

4. Planetary gearing comprising a driving shaft, a casing connected to revolve therewith, a supporting and abutment plate within the drum, a plurality of sets of planet pinions between an end of the drum and said plate and revolubly supported in said end and plate, a driven shaft extending within the drum and having a gear therein engaging corresponding members of the sets of planet pinions, a sleeve shaft revolubly on the first shaft, extending within the drum and having a gear engaging other corresponding pinions of said planetary sets, a sleeve slidable on said sleeve shaft and splined thereon, clutch means within the casing to connect the sleeve shaft and casing for direct driving and cooperating with said supporting abutment or friction plate, other clutch means acting between a stationary supporting structure and said sleeve and holding said sleeve and the sleeve shaft stationary for indirect driving through the planet sets, and a pressure and friction plate on said sleeve and located between said two clutch means for selectively engaging or disengaging them.

5. Planetary gearing comprising a driving shaft, a casing connected to revolve therewith, a supporting and abutment plate within the drum, a plurality of sets of planet pinions between an end of the drum and said plate and revolubly supported in said end and plate, a driven shaft extending within the drum and having a gear therein engaging corresponding members of the sets of planet pinions, a sleeve shaft revolubly on the first shaft, extending within the drum and having a gear engaging other corresponding pinions of said planetary sets, a sleeve slidable on said sleeve shaft and splined thereon, one or more friction plates connected to rotate with said sleeve shaft, one of said plates cooperating with said supporting and abutment plate within the drum, a stationary supporting structure, one or more friction plates revolubly connected to said supporting structure, one or more friction plates connected to rotate with said sleeve and interspaced with the stationary plates, and a friction plate fixed on said sleeve and intermediate the sets of friction plates aforesaid and cooperating with them to lock the driven shaft and sleeve shaft together, or to hold the sleeve shaft stationary.

6. Planetary gearing comprising a driven shaft, a casing connected to revolve therewith, a supporting and abutment plate within the drum, a plurality of sets of planet pinions between an end of the drum and said plate and revolubly supported in said end and plate, a driven shaft extending within the drum and having a gear therein engaging corresponding members of the sets of planet pinions, a sleeve shaft revolubly on the first shaft, extending within the drum and having a gear engaging other corresponding pinions of said planetary sets, a sleeve slidable on said sleeve shaft and splined thereon, one or more friction plates connected to rotate with said sleeve shaft, one of said plates cooperating with said supporting and abutment plate within the drum, a stationary supporting structure, one or more friction plates revolubly connected to said supporting structure, one or more friction plates connected to rotate with said sleeves and interspaced with the stationary plates, and a friction plate fixed on said sleeve and intermediate the first named friction plates and said stationary plates, and means for moving said sleeve shaft and sleeve relatively axially in opposite directions to selectively engage said sets of friction plates for direct and indirect driving.

7. Planetary gearing comprising a driving shaft, a casing connected to revolve therewith and constituting the driving member with fly wheel effect, a supporting and abutment plate within the drum, a plurality of sets of planet pinions between an end of the drum and said plate and revolubly supported in said end and plate, a driven shaft extending within the drum and having a gear therein engaging corresponding members of the sets of planet pinions, a sleeve shaft revolubly on the first shaft, extending within the drum and having a gear engaging other corresponding pinions of said planetary sets, a sleeve slidable on said sleeve shaft and splined thereon, one or more friction plates connected to rotate with said sleeve shaft, one of said plates cooperating with said supporting and abutment plate within the drum, a stationary supporting structure, one or more friction plates revolubly connected to said supporting structure, one or more friction plates connected to rotate with said sleeve and interspaced with the stationary plates, and a friction plate fixed on said sleeve and intermediate the sets of friction plates aforesaid and cooperating with them to lock the driven shaft and sleeve shaft together, or to hold the sleeve shaft stationary.

8. In gearing of the class described, including a driving drum open at one end, a plurality of sets of planet pinions revolubly mounted in a forward part of the drum, a clutch located within the rearward part of the drum near its open end, concentric shafts extending within the drum and having gears each engaging respectively similar pinions of said sets, a plate removably secured in the drum between said clutch and the planet sets, the planet sets having revoluble support in said plate, and the plate acting also as a clutch abutment, and means for operating the clutch.

9. In gearing of the class described, including a driving drum open at one end, a plurality of sets of planet pinions revolubly mounted in a forward part of the drum, a clutch located within the rearward part of the drum near its open end, concentric shafts extending within the drum and having gears each engaging respectively similar pinions of said sets, a plate in the drum between said clutch and the planet sets, the planet sets having revolubly support in said plate, and the plate acting also as a clutch abutment, means for operating the clutch, and another, movable plate for operating the clutch also having frictional cooperation with one of the clutch elements.

10. In gearing of the class described, including a driving drum open at one end, a plurality of sets of planet pinions revolubly mounted in a forward part of the drum, a clutch located within the rearward part of the drum near its open end, concentric shafts extending within the drum and having gears each engaging respectively similar pinions of said sets, a plate in the drum between said clutch and the planet sets, the planet sets having revoluble support in said plate, and the plate acting also as a clutch abutment, means for operating the clutch, and means acting between the drum and peripheral portions of said plate to retain the latter detachably in position.

11. In gearing of the class described, including a driving drum open at one end, a plurality of sets of planet pinions revolubly mounted in a forward part of the drum, a clutch located within the rearward part of the drum near its open end, concentric shafts extending within the drum and having gears each engaging respectively similar pinions of said sets, a plate in the drum between said clutch and the planet sets, the planet sets having revoluble support in said plate, and the plate acting also as a clutch abutment, means for operating the clutch, and radially acting means operable from the exterior of the drum to connect the drum and peripheral portions of said plate and detachably retain the latter in position.

12. In gearing of the class described, including a driving drum open at one end, a plurality of sets of planet pinions revolubly mounted in a forward part of the drum, a clutch located within the rearward part of the drum near its open end, concentric shafts extending within the drum and having gears each engaging respectively similar pinions of said sets, a plate in the drum between said clutch and the planet sets, the planet sets having revoluble support in said plate, and the plate acting also as a clutch abutment, a brake adjacent the open end of the drum and including a stationary element, to hold the outer one of said concentric shafts stationary for indirect driving, a plate located between the clutch and brake and a sleeve carrying said plate, extending rearward, slidable on and having non-rotary connection to the outer one of said concentric shafts, whereby the clutch and brake are selectively operated by movement of said plates.

13. In gearing of the class described, including a driving drum open at one end, a plurality of sets of planet pinions revolubly mounted in a forward part of the drum, a clutch located within the rearward part of the drum near its open end, concentric shafts extending within the drum and having gears each engaging respectively similar pinions of said sets, a plate in the drum between said clutch and the planet sets, the planet sets having revoluble support in said plate, and the plate acting also as a clutch abutment, a brake adjacent the open end of the drum and including a stationary element, to hold the outer one of said concentric shafts stationary for indirect driving, a plate located between the clutches and a sleeve carrying said plate, extending rearward, slidable on and having non-rotary connection to the outer one of said concentric shafts, whereby the clutch and brake are selectively operated by movement of said plates, which has friction faces co-operating with the clutch and brake.

In testimony whereof I affix my signature.

JOSEPH V. PETRELLI.